(12) United States Patent
Hong et al.

(10) Patent No.: US 11,513,185 B2
(45) Date of Patent: Nov. 29, 2022

(54) ELECTROMAGNETIC-WAVE-TRANSMISSIVE MODULE OF VEHICLE RADAR

(71) Applicants: Hyundai Motor Company, Seoul (KR); Kia Motors Corporation, Seoul (KR)

(72) Inventors: Seung Chan Hong, Gyeonggi-do (KR); Jae Hwan Ha, Gyeonggi-do (KR); Ill Joo Lee, Seoul (KR); So Jung Shim, Seoul (KR); Byung Kyu Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 288 days.

(21) Appl. No.: 16/884,662

(22) Filed: May 27, 2020

(65) Prior Publication Data
US 2021/0181298 A1    Jun. 17, 2021

(30) Foreign Application Priority Data
Dec. 16, 2019    (KR) .......................... 10-2019-0167530

(51) Int. Cl.
| | |
|---|---|
| G01S 7/03 | (2006.01) |
| H01Q 1/32 | (2006.01) |
| H01Q 1/42 | (2006.01) |
| G01S 13/931 | (2020.01) |
| G01S 7/02 | (2006.01) |

(52) U.S. Cl.
CPC ........... *G01S 7/032* (2013.01); *H01Q 1/3233* (2013.01); *H01Q 1/42* (2013.01); *G01S 7/027* (2021.05); *G01S 13/931* (2013.01)

(58) Field of Classification Search
CPC ..................... G01S 13/931; H01Q 1/42–1/428
See application file for complete search history.

(56) References Cited

U.S. PATENT DOCUMENTS

| | | | | |
|---|---|---|---|---|
| 4,173,187 A | * | 11/1979 | Steverding | ............. H01Q 1/424 244/159.1 |
| 4,684,954 A | * | 8/1987 | Sureau | ................... H01Q 1/425 343/754 |

(Continued)

FOREIGN PATENT DOCUMENTS

KR    2018-0008203 A    1/2018

*Primary Examiner* — Peter M Bythrow
(74) *Attorney, Agent, or Firm* — Fox Rothschild LLP

(57) ABSTRACT

An electromagnetic-wave-transmissive module of a vehicle radar is provided to minimize a dielectric impact reflection effect, which occurs when an electromagnetic wave radiated from an antenna is transmitted through a radome and a transmissive cover The electromagnetic-wave-transmissive module includes one or more of a radome covering the antenna and a transmissive cover, which is disposed to be spaced apart from a front side of the antenna and through which a radio wave radiated from the antenna and then transmitted through the radome is subsequently transmitted. At least one coating layer, which includes PTFE and which has a dielectric permittivity higher than the dielectric permittivity of air and lower than the dielectric permittivity of the radome and the transmissive cover, is formed on the surface of at least one of the radome and the transmissive cover.

17 Claims, 4 Drawing Sheets

(56) References Cited

U.S. PATENT DOCUMENTS

| | | | | |
|---|---|---|---|---|
| 4,783,666 A * | 11/1988 | Ast | H01Q 1/424 | 343/873 |
| 4,851,855 A * | 7/1989 | Tsukamoto | H01Q 21/0081 | 343/846 |
| 4,937,585 A * | 6/1990 | Shoemaker | H01Q 21/0087 | 343/777 |
| 4,946,736 A * | 8/1990 | Sassa | H01Q 1/422 | 156/324 |
| 5,270,721 A * | 12/1993 | Tsukamoto | H01Q 21/24 | 343/770 |
| 5,382,959 A * | 1/1995 | Pett | H01Q 21/24 | 343/846 |
| 5,408,244 A * | 4/1995 | Mackenzie | H01Q 1/422 | 343/873 |
| 6,285,323 B1 * | 9/2001 | Frank | H01Q 1/0006 | 343/795 |
| 6,747,108 B1 * | 6/2004 | Hosokawa | C08F 214/262 | 526/206 |
| 7,884,145 B2 * | 2/2011 | Hoshikawa | C08J 3/12 | 524/904 |
| 9,109,095 B2 * | 8/2015 | Ishikawa | H01M 4/623 | |
| 10,122,078 B2 * | 11/2018 | Hutcheson | H01Q 9/0492 | |
| 11,322,833 B2 * | 5/2022 | Milroy | H01Q 1/422 | |
| 2008/0001841 A1 * | 1/2008 | Alberding | H01Q 1/422 | 343/872 |
| 2009/0284436 A1 * | 11/2009 | McCarthy | H01Q 9/0414 | 343/872 |
| 2011/0199281 A1 * | 8/2011 | Morton | H01Q 1/42 | 343/872 |
| 2011/0221626 A1 * | 9/2011 | Hill | G01S 13/933 | 244/129.1 |
| 2015/0015453 A1 * | 1/2015 | Puzella | H05K 1/0206 | 333/1.1 |
| 2015/0022423 A1 * | 1/2015 | Johnson | B29C 66/636 | 156/217 |
| 2015/0207218 A1 * | 7/2015 | Bedinger | C04B 35/14 | 427/398.1 |
| 2017/0222310 A1 * | 8/2017 | Merk | H01Q 1/42 | |
| 2017/0284017 A1 * | 10/2017 | Petra | D06M 15/227 | |
| 2018/0375203 A1 * | 12/2018 | Petra | H01Q 1/427 | |
| 2019/0207302 A1 * | 7/2019 | Yamada | G01S 7/027 | |
| 2019/0296428 A1 * | 9/2019 | Hashimoto | H01Q 1/42 | |
| 2020/0212556 A1 * | 7/2020 | Moore | H01Q 1/421 | |
| 2020/0295452 A1 * | 9/2020 | Yamada | G01S 13/931 | |
| 2020/0381842 A1 * | 12/2020 | Milroy | H01Q 3/04 | |
| 2021/0013601 A1 * | 1/2021 | Takemoto | C08G 18/3225 | |
| 2021/0210846 A1 * | 7/2021 | Sekiguchi | H01Q 1/422 | |
| 2021/0359403 A1 * | 11/2021 | Nakajima | H01Q 1/421 | |

\* cited by examiner

-PRIOR ART-

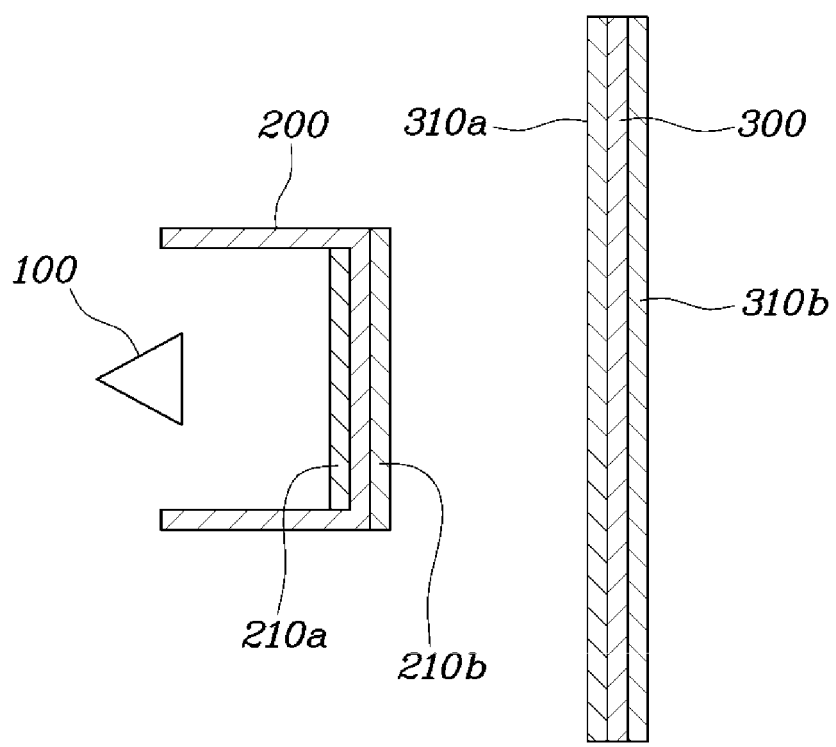

ELECTROMAGNETIC-WAVE-TRANSMISSIVE MODULE OF VEHICLE RADAR

CROSS REFERENCE TO RELATED APPLICATION

The present application claims priority to Korean Patent Application No. 10-2019-0167530, filed Dec. 16, 2019, the entire content of which is incorporated herein for all purposes by this reference.

BACKGROUND

1. Field of the Disclosure

The present disclosure relates to an electromagnetic-wave-transmissive module of a vehicle radar, and more particularly, to an electromagnetic-wave-transmissive module of a vehicle radar, which minimizes a dielectric impact reflection effect, which occurs when an electromagnetic wave radiated from an antenna is transmitted through a radome and a transmissive cover.

2. Description of the Related Art

Recently, with the development of high-frequency wireless communication technology and increased interest in automobile safety technology, demand for vehicle radar technology has increased. A representative example of application of vehicle radar technology is a smart cruise system. The smart cruise system detects the movement of a preceding vehicle using a radar device mounted at the front of a vehicle and thus operates the engine and brakes thereof to accelerate or decelerate the vehicle to avoid preceding vehicles and change lanes, or to accelerate to an initially set speed and then maintain constant-speed driving when there is no preceding vehicle.

To realize such a smart cruise system, the vehicle is equipped with a radar device and collects information regarding the presence and movement of preceding vehicles through the transmission and reception of electromagnetic waves radiated from the radar device. In general, the radar device includes an antenna configured to transmit and receive electromagnetic waves, internal electronic parts such as a millimeter-wave radio-frequency integrated circuit (RFIC), and a radome for protecting the same. Further, a transmissive cover for protecting the radar device is disposed in front of the radome.

FIG. 1 is a view showing a general electromagnetic-wave-transmissive module of a vehicle radar according to the prior art. The electromagnetic wave radiated from an antenna 10 of a radar device mounted within a vehicle is sequentially transmitted through a radome 20 and a transmissive cover 30 and is then radiated forwards. The electromagnetic wave radiated from the antenna 10 is changed in terms of wavelength and is attenuated due to the dielectric permittivity of the medium through which the electromagnetic wave is transmitted.

In further detail, as shown in FIG. 1, the electromagnetic wave radiated from the antenna 10 is mostly transmitted through the radome 20 to the transmissive cover 30 when coming into contact with the radome 20, but a part thereof is reflected on the radome 20. When the electromagnetic wave that is radiated from the antenna 10 and is then incident on the radome 20 is defined as a first incident wave L1 and when the electromagnetic wave reflected on the radome 20 is defined as a first reflection wave R1, the transmittance of the radome 20 is a value obtained by subtracting the first reflection wave R1 from the first incident wave L1. When the electromagnetic wave that is transmitted through the radome 20 and is then incident on the transmissive cover 30 is defined as a second incident wave L2 and when the electromagnetic wave reflected on the transmissive cover 30 is defined as a second reflection wave R2, the transmittance of the transmissive cover 30 is a value obtained by subtracting the second reflection wave R2 from the second incident wave L2.

The electromagnetic wave radiated from the antenna 10 is partially reflected while being transmitted through the radome 20 and the transmissive cover 30. Accordingly, only a transmission wave L3 obtained by subtracting the first reflection wave R1 and the second reflection wave R2 from the first incident wave L1 is radiated forwards. Therefore, to improve the efficiency of transmission and reception of the electromagnetic wave radiated from the antenna 10, it is important to improve the electromagnetic-wave transmittance of the radome 20 and the transmissive cover 30.

The contents described as the background art are merely for understanding the background of the present disclosure, and should not be taken as corresponding to the related arts already known to those skilled in the art.

SUMMARY

The present disclosure provides an electromagnetic-wave-transmissive module of a vehicle radar, in which a coating layer is formed on a radome or a transmissive cover disposed on a path through which an electromagnetic wave radiated from an antenna is transmitted based on dielectric permittivity, thereby improving the transmittance of the radome or the transmissive cover through which the electromagnetic wave is transmitted.

An electromagnetic-wave-transmissive module of a vehicle radar according to an exemplary embodiment of the present disclosure is a transmissive module through which an electromagnetic wave radiated from an antenna of a radar mounted within a vehicle is transmitted. The electromagnetic-wave-transmissive module may include one or more of a radome covering the antenna and a transmissive cover, which is disposed to be spaced apart from a front side of the antenna and through which a radio wave radiated from the antenna and then transmitted through the radome may be subsequently transmitted. At least one coating layer, which includes Polytetrafluoroethylene (PTFE) and which has a dielectric permittivity higher than the dielectric permittivity of air and lower than the dielectric permittivity of the radome and the transmissive cover, may be formed on the surface of at least one of the radome and the transmissive cover.

The coating layer may be a dome coating layer formed on at least one surface of the radome, among surfaces thereof. The dome coating layer may include a first dome coating layer formed on the surface of the radome facing an antenna. The dome coating layer may further include a second dome coating layer formed on the surface of the first dome coating layer facing the antenna, and the dielectric permittivity of the second dome coating layer is lower than the dielectric permittivity of the first dome coating layer. The dome coating layer may also include a third dome coating layer formed on an opposite surface of the surface of the radome facing the antenna.

The coating layer may be a cover coating layer formed on at least one surface of the transmissive cover, among surfaces thereof. The cover coating layer may include a first cover coating layer formed on the surface of the transmissive cover facing the radome. The cover coating layer may further include a second cover coating layer formed on the surface of the first cover coating layer that faces the radome, and the dielectric permittivity of the second cover coating layer is lower than the dielectric permittivity of the first cover coating layer. The cover coating layer may also include a third dome coating layer formed on an opposite surface of the surface of the transmissive cover facing the radome.

The coating layer may have a dielectric permittivity of about 1.7 to 3.0 and a surface roughness of about 2.0 or less based on Ra. Additionally, the coating layer may have a thickness of about 1 to 100 μm. An impregnating material contained in the coating layer may have a particle size of about 50 nm to 1 μm.

According to an exemplary embodiment of the present disclosure, it may be possible to form a coating layer having a dielectric permittivity lower than that of a radome and a transmissive cover on the radome or the transmissive cover through which an electromagnetic wave radiated from an antenna is transmitted to prevent the transmittance of the electromagnetic wave from being reduced, thereby improving the electromagnetic-wave output efficiency of a radar.

BRIEF DESCRIPTION OF THE DRAWINGS

The above and other objects, features and advantages of the present disclosure will be more clearly understood from the following detailed description taken in conjunction with the accompanying drawings, in which:

FIGS. 3 and 4 are views showing electromagnetic-wave-transmissive modules of vehicle radars according to other exemplary embodiments of the present disclosure.

DETAILED DESCRIPTION

Figure 1:
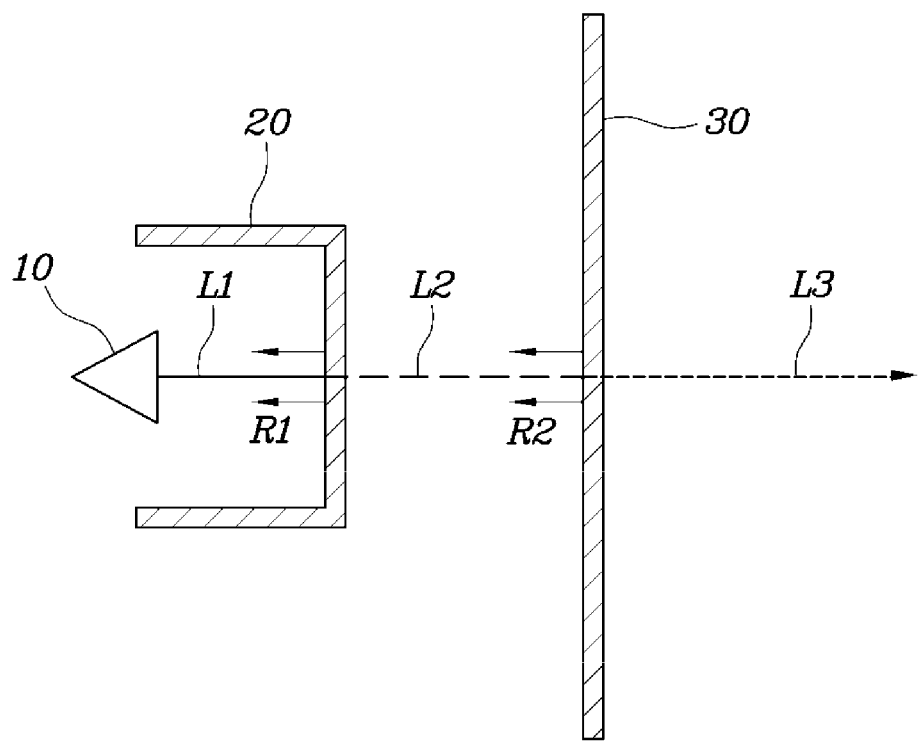
FIG. 1 is a view showing a general electromagnetic-wave-transmissive module of a vehicle radar according to the prior art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in more detail with reference to the accompanying drawings. However, the present disclosure is not limited to the embodiments disclosed below, but will be realized in various different forms, and the present embodiments are merely provided to complete the disclosure of the present disclosure and to fully inform those skilled in the art of the scope of the disclosure. Like reference numerals refer to like elements in the drawings.

Figure 2:
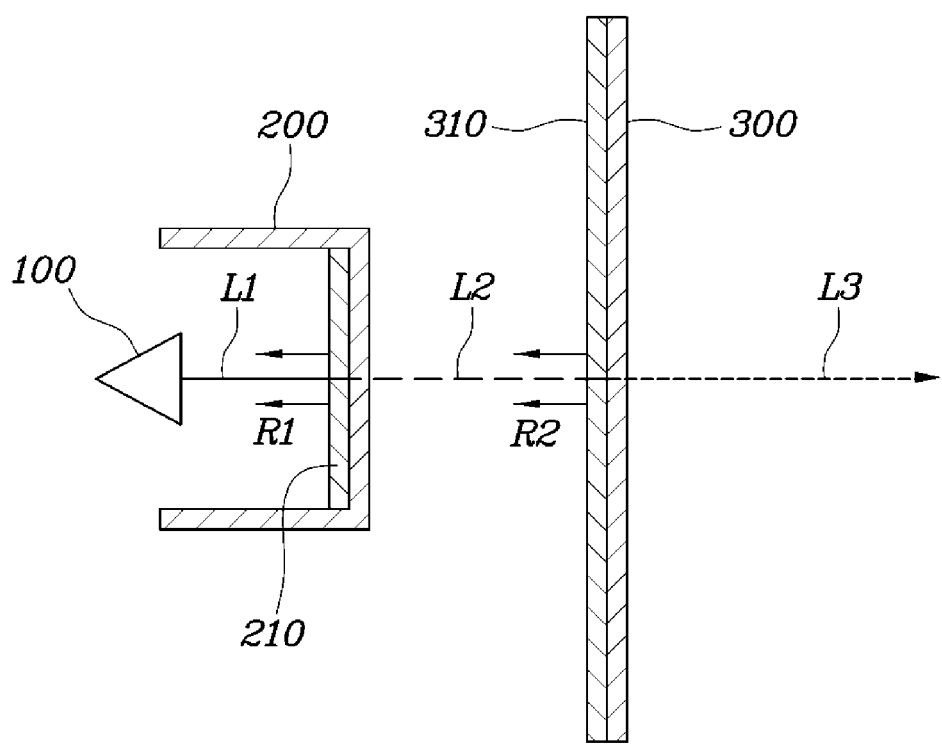
FIG. 2 is a view showing an electromagnetic-wave-transmissive module of a vehicle radar according to an exemplary embodiment of the present disclosure.

FIG. 2 is a view showing an electromagnetic-wave-transmissive module of a vehicle radar according to an exemplary embodiment of the present disclosure. As shown in FIG. 2, the electromagnetic-wave-transmissive module of the vehicle radar according to the exemplary embodiment of the present disclosure is a transmissive module through which an electromagnetic wave radiated from an antenna 100 of a radar device mounted within a vehicle is transmitted. The electromagnetic-wave-transmissive module may include a radome 200 that covers the antenna 100 and a transmissive cover 300, which is disposed to be spaced apart from a front side of the radome 200 and through which radio waves radiated from the antenna 100 and then transmitted through the radome 200 may be subsequently transmitted.

The present exemplary embodiment shows an example in which both the radome 200 and the transmissive cover 300 are provided. However, the radome 200 and the transmissive cover 300 may not both be provided in accordance with structural changes of vehicles and the development of technology, and any one of the radome 200 and the transmissive cover 300 may be selectively provided. For example, the radome 200 may operate as the transmissive cover 300, and the transmissive cover 300 may be eliminated. Similarly, the transmissive cover 300 may operate as the radome 200 while eliminating the radome 200. However, hereinafter, for the convenience of description, an exemplary embodiment in which both the radome 200 and the transmissive cover 300 are provided as shown in the drawings will be used as the basis for description.

Meanwhile, at least one coating layer, which has a dielectric permittivity higher than the dielectric permittivity of air and lower than the dielectric permittivity of the radome 200 and the transmissive cover 300, may be formed on the surface of at least one of the radome 200 and the transmissive cover 300. Therefore, the coating layer may be a dome coating layer formed on at least one surface of the radome 200, among surfaces thereof, and the coating layer may be a cover coating layer formed on at least one surface of the transmissive cover, among surfaces thereof.

For example, as shown in FIG. 2, the coating layer may include a first dome coating layer 210 formed on the surface of the radome 200 facing the antenna and a first cover coating layer 310 formed on the surface of the transmissive cover 300 facing the radome. The present disclosure is not limited to formation of both first dome coating layer 210 and the first cover coating layer 310, and only one of the first dome coating layer 210 and the first cover coating layer 310 may be formed.

Further, the coating layer may have a dielectric permittivity of about 1.7 to 3.0 since the radome 200 and the transmissive cover 300, which are generally formed as plastic injection-molded products, have a dielectric permittivity of about 2.7 to 4.0. In particular, the electromagnetic wave is changed in terms of wavelength and is lost due to the dielectric permittivity of the medium through which the electromagnetic wave is transmitted.

A reflectance R is defined by the following Relational Equation 1.

$$\text{Reflectance}(R) = (\sqrt{\varepsilon 1} - \sqrt{\varepsilon 2})^2 / (\sqrt{\varepsilon 1} + \sqrt{\varepsilon 2})^2 \quad \text{Relational Equation (1)}$$

wherein, $\varepsilon 1$ and $\varepsilon 2$ are the dielectric permittivity of the transmission material.

Meanwhile, in consideration of the structure of the vehicle radar device, in which the electromagnetic wave radiated from the antenna 100 is transmitted through an air layer and then through the radome 200 and the transmissive cover 300, and of Relational Equation 1, to obtain the optimum transmittance of the electromagnetic wave transmitted through the radome 200 or the transmissive cover 300, the following Relational Equation 2 for determining the optimum dielectric permittivity of the coating layer formed between the air layer and the radome 200 or the transmissive cover 300 may be used.

$$\text{Dielectric permittivity of coating layer} = \sqrt{\varepsilon_a \times \varepsilon_s} \quad \text{Relational Equation (2)}$$

wherein, $\varepsilon_a$ is the dielectric permittivity of air and $\varepsilon_s$ is the dielectric permittivity of the radome 200 or the transmissive cover 300.

For example, when an electromagnetic wave of 76 GHz is transmitted through a radome 200 including a material having a dielectric permittivity of 4, the dielectric permittivity of air is 1, and the dielectric permittivity of the radome is 4, so the reflectance 1 of the electromagnetic wave is about 0.11 (about 11%), as shown by solving the following Relational Equation 1.

$$\text{Reflectance}(1) = (\sqrt{4} - \sqrt{1})^2 / (\sqrt{4} + \sqrt{1})^2 \approx 0.11$$

In contrast, when the coating layer is formed on the radome 200 including a material having a dielectric permittivity of 4, the optimum dielectric permittivity of the coating layer is 2, as shown by solving the following Relational Equation 2.

$$\text{Optimum dielectric permittivity of coating layer} = \sqrt{1 \times 4} = 2$$

Accordingly, when the radome 200 on which the coating layer having a dielectric permittivity of 2 is formed, the reflectance 2 of the electromagnetic wave is about 0.058 (about 5.8%), as shown by solving the following Relational Equation 1.

$$\text{Reflectance}(2) = \{(\sqrt{2} - \sqrt{2})^2 / (\sqrt{2} + \sqrt{1})^2\} + \{(\sqrt{4} - \sqrt{1})^2 / (\sqrt{4} + \sqrt{1})^2\} \approx 0.058$$

As shown in the above-described example, based on a comparison of the reflectance 1 of the radome 200 that does not include the coating layer and the reflectance 2 of the radome 200 that includes the coating layer having the dielectric permittivity of 2 formed thereon, the reflectance 2 of the radome 200 that includes the coating layer formed thereon is smaller. This shows that the transmittance of the electromagnetic wave transmitted through the radome 200 is improved when the coating layer having a dielectric permittivity higher than the dielectric permittivity of air and lower than the dielectric permittivity of the radome 200 is formed on the radome 200, since the reflectance of the electromagnetic wave is low.

Accordingly, when the coating layer is formed on the radome 200 and the transmissive cover 300 having a dielectric permittivity of 2.7 to 4.0, the coating layer may be formed to have a dielectric permittivity of about 1.7 to 2.0 and thus, the optimum dielectric permittivity of the coating layer has a value of $\sqrt{1 \times 2.7}$ to $\sqrt{1 \times 4}$.

However, the dielectric permittivity of an impregnating material of a coating solution used to form the coating layer is mostly in the range of 2.0 (PTFE) to 2.7 (PP). Accordingly, the dielectric permittivity of the coating layer may fall within the range from 1.7 to 3.0 in consideration of the dielectric permittivity value of 1.7 to 2.0, calculated using the above-described Relational Equation 2, and the dielectric permittivity of the impregnating material impregnated in the coating solution. Of course, it is further preferable that the dielectric permittivity fall within the range from 1.7 to 2.7. In consideration of the selection of the impregnating material and the theoretical optimal dielectric permittivity of the coating layer, it may be preferable to form a coating layer using polytetrafluoroethylene (PTFE) having a dielectric permittivity of 2.0.

Further, the reason for selecting PTFE (polytetrafluoroethylene) as the impregnating material for forming the coating layer is that PTFE has a dielectric permittivity lower than those of the materials TPO, ABS, ASA, PP, and PBT, which are plastic materials generally used in automobile parts. Further, a liquid coating method is useful as a method of realizing the thickness of the coating layer to be described later using the impregnating material including the plastic material. PTFE, having excellent low dielectric properties, is suitable for forming a coating layer using the liquid coating method. The liquid coating method herein refers to a method of forming a coating layer by mixing the impregnating material with a binder and then coating the surface of the radome 200 or the transmissive cover 300 therewith, and the desired thickness of the coating layer may thus be realized more easy as to be described later in the case where PTFE is used.

Meanwhile, to improve the transmittance of electromagnetic waves transmitted through the radome 200 and the transmissive cover 300, the numerical values of the thickness and the surface roughness of the coating layer may be limited. For example, to expect an output improvement of about 5% or greater based on the radiation output of the electromagnetic wave radiated from the antenna 100, a coating layer may be formed to have a surface roughness of 2.0 or less based on Ra.

Further, a coating layer having a thickness of 1 to 100 μm may be formed. When the thickness of the coating layer is less than 1 μm, it may be difficult to realize the liquid coating method using the PTFE as the impregnating material. When the thickness of the coating layer is greater than 100 μm, cracks may form in the coating layer, or peeling of the coating layer may occur due to residual stress in the coating layer. In addition, the particle size of the low dielectric impregnating material impregnated in the coating solution for forming the coating layer is preferably limited to 50 nm to 1 μm.

When the size of the impregnating material is less than 50 nm, it may be impossible to realize the effect of improving the transmittance due to particle dispersion, which is called Mie scattering. In other words, when the size of the impregnating material is less than 50 nm, electromagnetic waves may be scattered only in the advancing direction, whereby the Mie scattering effect of improving the transmittance and reducing the reflectance disappears. In addition, when the size of the impregnating material is greater than 1 μm, scattering of electromagnetic waves may occur due to an increase in surface roughness, and thus, an effect of increasing the transmittance is unable to be achieved.

Figure 3:
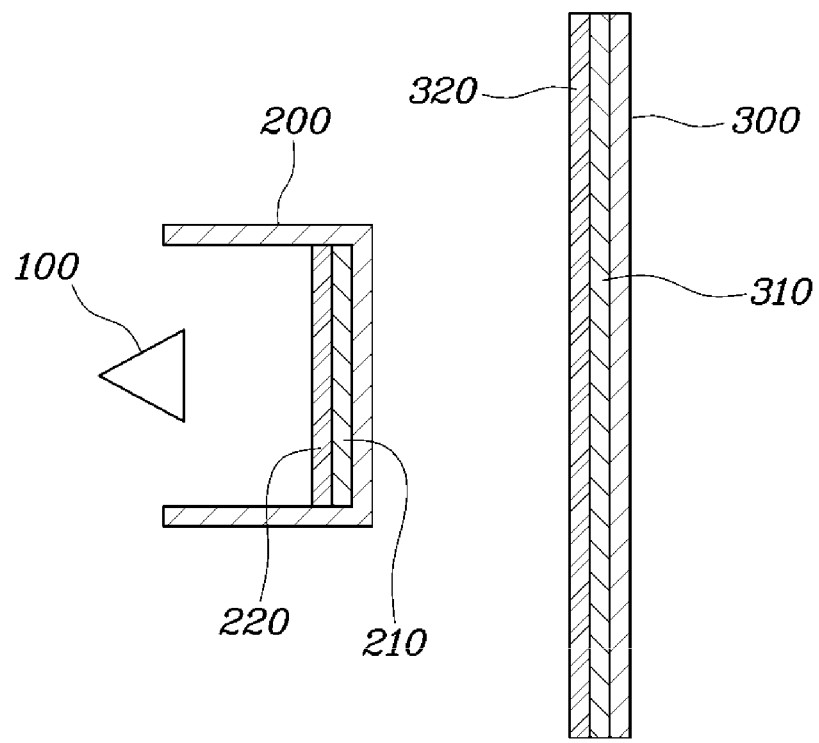

Meanwhile, in the present disclosure, it may be possible to improve the efficiency of output of electromagnetic waves radiated from the antenna by modifying the coating layer formed on the radome or the transmissive cover in various ways. FIGS. 3 and 4 are views showing electromagnetic-wave-transmissive modules of vehicle radars according to other exemplary embodiments of the present disclosure.

FIG. 3 is a view showing an example of improving the efficiency of output of electromagnetic waves by increasing the number of coating layers. As shown in FIG. 3, the dome coating layer formed on the radome 200 may further include a second dome coating layer 220 formed on the surface of the first dome coating layer 210 facing the antenna 100, together with the above-described first dome coating layer 210. Thus, the electromagnetic waves radiated from the antenna 100 may be sequentially transmitted through the second dome coating layer 220, the first dome coating layer 210, and the radome 200.

The dielectric permittivity of the second dome coating layer 220 may be lower than that of the first dome coating layer 210. Thus, the electromagnetic waves radiated from the antenna 100 may be sequentially transmitted through the second dome coating layer 220, the first dome coating layer 210, and the radome 200, formed to gradually increase the dielectric permittivity. Meanwhile, similar to the first dome coating layer 210 and the second dome coating layer 220 formed on the radome 200, a first cover coating layer 310 and a second cover coating layer 320 may be formed on the transmissive cover 300.

Particularly, the cover coating layer formed on the surface of the transmissive cover 300 may further include a second cover coating layer 320, formed on the surface of the first cover coating layer 310 facing the radome 200 together with the first cover coating layer 310. Thus, the electromagnetic waves radiated from the antenna 100 may be transmitted through the radome 200, in detail, sequentially through the second dome coating layer 220, the first dome coating layer 210, and the radome 200. Next, the electromagnetic waves may be sequentially transmitted through the air layer, the second cover coating layer 320, the first cover coating layer 310, and the transmissive cover 300.

The dielectric permittivity of the second cover coating layer 320 may be lower than the dielectric permittivity of the first cover coating layer 310. Therefore, the electromagnetic waves transmitted through the radome 200 may be sequentially transmitted through the second cover coating layer 320, the first cover coating layer 310, and the transmissive cover 300, formed to gradually increase the dielectric permittivity.

Meanwhile, FIG. 4 is a view showing an example of improving the efficiency of output of electromagnetic waves by changing the position at which the coating layer is formed. As shown in FIG. 4, the dome coating layer formed on the radome 200 may further include a third dome coating layer 210b formed on an opposite surface of the surface of the radome 200 facing the antenna 100, together with the above-described first dome coating layer 210a. Thus, the electromagnetic waves radiated from the antenna 100 may be sequentially transmitted through the first dome coating layer 210a, the radome 200, and the third dome coating layer 210b.

The first dome coating layer 210a and the third dome coating layer 210b may be formed to have the same dielectric permittivity. Accordingly, the electromagnetic waves radiated from the antenna 100 may be sequentially transmitted through the first dome coating layer 210a and the radome 200, formed to gradually increase the dielectric permittivity. Next, the electromagnetic wave may be transmitted through the third dome coating layer 210b, which has a dielectric permittivity between the dielectric permittivities of the radome 200 and the air layer, before being transmitted through the air layer, thereby improving the efficiency of output of electromagnetic waves.

Further, similar to the first dome coating layer 210a and the third dome coating layer 210b formed on the radome 200, a first cover coating layer 310a and a third cover coating layer 310b may be formed on the transmissive cover 300. In particular, the cover coating layer formed on the surface of the transmissive cover 300 may further include the third cover coating layer 310b formed on the surface of the transmissive cover 300 facing the radome 200, together with the first cover coating layer 310a. Thus, the electromagnetic waves radiated from the antenna 100 may be transmitted through the radome 200, in detail, through the first dome coating layer 210a, the radome 200, and the third coating layer 210b in sequence. Next, the electromagnetic waves may be sequentially transmitted through the air layer, the first cover coating layer 310a, the transmissive cover 300, and the third cover coating layer 310b.

The first cover coating layer 310a and the third cover coating layer 310b may be formed to have the same dielectric permittivity. Accordingly, the electromagnetic waves transmitted through the radome 200 may be sequentially transmitted through the first cover coating layer 310 and the transmissive cover 300, formed to gradually increase the dielectric permittivity. Next, the electromagnetic waves may be transmitted through the third cover coating layer 310b, which has a dielectric permittivity between the dielectric permittivities of the transmissive cover 300 and the air layer, before being transmitted through the air layer, thereby improving the efficiency of output of electromagnetic waves.

Although the present disclosure has been described with reference to the accompanying drawings and the exemplary embodiments described above, the present disclosure is not limited thereto, but is defined by the appended claims. Accordingly, one of ordinary skill in the art may variously transform and modify the present disclosure without departing from the technical spirit of the appended claims.

What is claimed is:

1. An electromagnetic-wave-transmissive module of a vehicle radar, through which an electromagnetic wave radiated from an antenna of a radar mounted within a vehicle is transmitted, the electromagnetic-wave-transmissive module comprising:
   one or more of a radome and a transmissive cover, wherein the radome covers the antenna and where the transmissive cover is disposed to be spaced apart from a front side of the antenna and through which a radio wave radiated from the antenna and then transmitted through the radome is subsequently transmitted,
   wherein at least one coating layer, which includes polytetrafluoroethylene (PTFE) and which has a dielectric permittivity higher than a dielectric permittivity of air and lower than a dielectric permittivity of the radome and the transmissive cover, is formed on a surface of at least one of the radome and the transmissive cover
   wherein an impregnating material contained in the at least one coating layer has a particle size of about 50 nm to 1 μm.

2. The electromagnetic-wave-transmissive module of the vehicle radar of claim 1, wherein the at least one coating layer is a dome coating layer formed on at least one surface of the radome, among surfaces thereof.

3. The electromagnetic-wave-transmissive module of the vehicle radar of claim 2, wherein the dome coating layer includes a first dome coating layer formed on a surface of the radome facing an antenna.

4. The electromagnetic-wave-transmissive module of the vehicle radar of claim 3, wherein the dome coating layer includes a second dome coating layer formed on a surface of the first dome coating layer facing the antenna, and a dielectric permittivity of the second dome coating layer is lower than a dielectric permittivity of the first dome coating layer.

5. The electromagnetic-wave-transmissive module of the vehicle radar of claim 3, wherein the dome coating layer includes a third dome coating layer formed on an opposite surface of the surface of the radome facing the antenna.

6. The electromagnetic-wave-transmissive module of the vehicle radar of claim 1, wherein the at least one coating layer is a cover coating layer formed on at least one surface of the transmissive cover, among surfaces thereof.

7. The electromagnetic-wave-transmissive module of the vehicle radar of claim 6, wherein the cover coating layer includes a first cover coating layer formed on a surface of the transmissive cover facing a radome.

8. The electromagnetic-wave-transmissive module of the vehicle radar of claim 7, wherein the cover coating layer includes a second cover coating layer formed on a surface of the first cover coating layer facing the radome, and a dielectric permittivity of the second cover coating layer is lower than a dielectric permittivity of the first cover coating layer.

9. The electromagnetic-wave-transmissive module of the vehicle radar of claim 7, wherein the cover coating layer includes a third dome coating layer formed on an opposite surface of the surface of the transmissive cover facing the radome.

10. The electromagnetic-wave-transmissive module of the vehicle radar of claim 1, wherein the at least one coating layer has a dielectric permittivity of about 1.7 to 3.0.

11. The electromagnetic-wave-transmissive module of the vehicle radar of claim 10, wherein the at least one coating layer has a surface roughness of about 2.0 or less based on Ra.

12. The electromagnetic-wave-transmissive module of the vehicle radar of claim 10, wherein the at least one coating layer has a thickness of about 1 to 100 μm.

13. An electromagnetic-wave-transmissive module of a vehicle radar, through which an electromagnetic wave radiated from an antenna of a radar mounted within a vehicle is transmitted, the electromagnetic-wave-transmissive module comprising:
one or more of a radome and a transmissive cover, wherein the radome covers the antenna and where the transmissive cover is disposed to be spaced apart from a front side of the antenna and through which a radio wave radiated from the antenna and then transmitted through the radome is subsequently transmitted,
wherein at least one coating layer, which includes polytetrafluoroethylene (PTFE), is formed on a surface of at least one of the radome and the transmissive cover, and
wherein the at least one coating layer 1) comprises an impregnating material that has a particle size of about 50 nm to 1 μm; 2) has a dielectric permittivity of 1.7 to 3.0, 3) has a surface roughness of about 2.0 or less based on Ra, and 4) has a thickness of about 1 to 100 μm.

14. The electromagnetic-wave-transmissive module of the vehicle radar of claim 13, wherein the at least one coating layer is a cover coating layer formed on at least one surface of the transmissive cover, among surfaces thereof.

15. The electromagnetic-wave-transmissive module of the vehicle radar of claim 14, wherein the cover coating layer includes a first cover coating layer formed on a surface of the transmissive cover facing a radome.

16. The electromagnetic-wave-transmissive module of the vehicle radar of claim 15, wherein the cover coating layer includes a second cover coating layer formed on a surface of the first cover coating layer facing the radome, and a dielectric permittivity of the second cover coating layer is lower than a dielectric permittivity of the first cover coating layer.

17. The electromagnetic-wave-transmissive module of the vehicle radar of claim 15, wherein the cover coating layer includes a third dome coating layer formed on an opposite surface of the surface of the transmissive cover facing the radome.

* * * * *